(12) United States Patent
Dierkes

(10) Patent No.: US 10,493,704 B2
(45) Date of Patent: Dec. 3, 2019

(54) RESIN LINE WITH FLOW AID

(71) Applicant: Faserverbund Innovations UG (haftungsbeschränkt), Ibbenbüren (DE)

(72) Inventor: Dominik Dierkes, Ibbenbüren (DE)

(73) Assignee: Faserverbund Innovations UG (haftungsbeschränkt), Ibbenbüren (DE)

( * ) Notice: Subject to any disclaimer, the term of this patent is extended or adjusted under 35 U.S.C. 154(b) by 388 days.

(21) Appl. No.: 15/503,015

(22) PCT Filed: Jul. 28, 2015

(86) PCT No.: PCT/EP2015/001549
§ 371 (c)(1),
(2) Date: Feb. 10, 2017

(87) PCT Pub. No.: WO2016/023618
PCT Pub. Date: Feb. 18, 2016

(65) Prior Publication Data
US 2017/0225412 A1    Aug. 10, 2017

(30) Foreign Application Priority Data
Aug. 12, 2014  (DE) .................. 10 2014 011 787

(51) Int. Cl.
*B29C 70/00* (2006.01)
*B29C 70/54* (2006.01)
*B29C 70/44* (2006.01)

(52) U.S. Cl.
CPC .......... *B29C 70/548* (2013.01); *B29C 70/443* (2013.01)

(58) Field of Classification Search
CPC ................................................... B29C 70/548
See application file for complete search history.

(56) References Cited

U.S. PATENT DOCUMENTS

| | | | |
|---|---|---|---|
| 3,936,336 A | 2/1976 | Phillips | |
| 2003/0063888 A1 | 4/2003 | Sahlin et al. | |
| 2004/0240829 A1 | 12/2004 | Sahlin et al. | |
| 2008/0079193 A1 | 4/2008 | Hanks | |
| 2009/0057487 A1* | 3/2009 | Velicki | B29C 70/443 244/119 |
| 2014/0027001 A1 | 1/2014 | Matzen | |

FOREIGN PATENT DOCUMENTS

| | | |
|---|---|---|
| CN | 1561461 | 1/2005 |
| CN | 103574188 | 2/2014 |

* cited by examiner

*Primary Examiner* — Timothy Kennedy
(74) *Attorney, Agent, or Firm* — Gudrun E. Huckett

(57) ABSTRACT

The invention relates to a resin line (2) with openings on the circumference and a sleeve made of a flow aid material (4). The aim of the invention is to design the resin line such that the resin line does not leave impressions on the surface of the component under the effect of a vacuum and the resin dispensing process is improved. This is achieved in that the flow aid material (4) is placed about the resin line (2) such that the flow aid material (4) tabs (8) projecting beyond the resin line (2) form a double-layer web (6), in the region of which the tabs (8) are connected together.

10 Claims, 1 Drawing Sheet

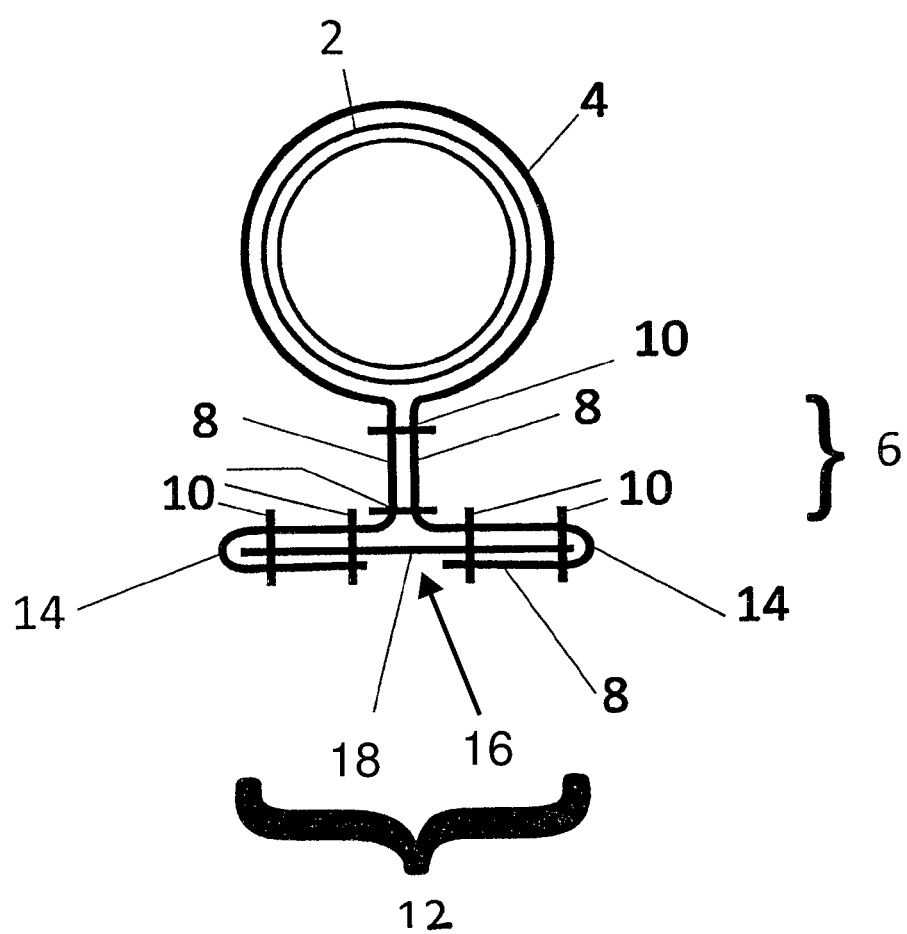

RESIN LINE WITH FLOW AID

BACKGROUND OF THE INVENTION

The present invention concerns a resin line with openings on the circumference and with an envelope of a flow aid material.

A resin line is known in the prior art which is employed in a vacuum infusion method in order to introduce therewith a matrix material into an infusion tool that is airtightly closed. In order to improve outflow of the matrix material from the resin line and its penetration and spreading in the infusion tool, the resin line is enveloped by a flow aid. However, when using the resin lines, it has been found to be disadvantageous that the shape of the resin line is showing as an impression in the surface of the completed lamination because the sealing film pulls the resin line against the component due to the vacuum. Moreover, the contact surface of the resin line with the flow aid toward the interior of the tool through which matrix material can flow into the interior of the tool is relatively small under vacuum effect. Accordingly, the entry of the matrix material into the interior as well as its distribution are delayed.

It is the object of the present invention to design the resin line in such a way that under vacuum effect it does not leave any impressions on the surface of the component and dispensing of the resin is improved.

SUMMARY OF THE INVENTION

The object is solved for a resin line of the aforementioned kind in that the flow aid material is placed about the resin line in such a way that the flaps of the flow aid material projecting past the resin line form a double layer stay and in the stay area the flaps are connected to each other.

The term stay is to be understood as a section in which the flaps of the flow aid material are held resting against each other across its height. For forming such a stay, it is not sufficient that the flaps are connected to each other by a seam extending in longitudinal direction of the resin line. Viewed across the length of the stay, the flaps are connected to each other at least at two locations that are spaced apart from each other. The connections can be connected to each other by a seam, an adhesive, a weld connection, a clamp, a rivet, needling of the fibers of the flow aid material, a hook and loop fastener, or in other ways.

Due to the double layer stay, the resin line is held at a spacing relative to the surface of the component to be built. Since the stay is formed only by the material of the flow aid material, the web is very thin. Under the effect of the vacuum, the sealing film laterally contacts the stay so that the resin line, even under the action of the vacuum, is not pulled onto the component surface. Due to the configuration of the stay with a double layer flow aid material, it is still sufficiently thick in order to allow the matrix material to be dispensed sufficiently fast from the resin line into the tool, even under vacuum effect. The flow aid material acts in this way as kind of a spacer fabric that prevents pinching off of the inflow gap for the matrix material by the sealing film under vacuum. The resin line with the stay according to the invention can be placed simply onto the tool; a special alignment and/or fixation is not required.

The resin line can be formed as a flexible spiral hose wherein the spirally extending cut in the material of the spiral line forms the opening on the circumference; however, other hose shapes with openings that are embodied in a different way can be used also. The flow aid material can be made, for example, of a nonwoven material or of a net material.

According to one embodiment of the invention, an angled section adjoins the stay at its end which is facing away from the resin line. The angled section forms in relation to the stay a support surface with which the resin line with the stay can be positioned in a tool without additional positioning and fixation expenditure. Due to the angled section, the resin line is supported even more safely in the tool and does not easily fall over when the sealing film or other layers are placed onto the tool. The angled section can preferably be angled approximately 90° relative to the stay. The stay is thus vertically, or at least approximately vertically, positioned on the tool surface and enables in this way a good resin flow. In order not to disturb the resin flow, the angled section is designed to be penetrable by the matrix material. The end of the stay which is facing away from the resin line forms a kind of mouth for the flowing matrix material that can flow out well into the tool through this mouth. The angled section can be formed entirely or partially from the flow aid material. When the angled section is formed only of the flow aid material, it is not necessary to fasten additional material on the stay. Otherwise, it is required to attach to the stay, or to overlapping parts, additional material wherein the aforementioned connecting techniques can be employed for this purpose. The additional angled section can contribute to retaining air bubbles transported within the matrix material.

According to one embodiment of the invention, in a section adjoining the stay, one or both flaps are laid to one or two loops which form the angled section. By one or two loops formed of the projecting flaps of the flow aid material, a good support action is provided without additional material having to be attached to the flaps.

According to one embodiment of the invention, the ends of the flaps have a spacing relative to each other and form a gap between them. Due to the gap remaining between the ends of the flaps, the matrix material can flow out better from the resin hose into the tool.

According to one embodiment of the invention, the angled section is reinforced by a support material which is connected to the angled section. An improved supporting action results from a support material. The support material can also enhance outflow of the matrix material as well as its wide spreading.

The support material can be, for example, a hook and loop pad that can be easily connected to the flow aid material.

According to one embodiment of the invention, the support material is inserted into the loop or the loops. In this way, a particular strength of the angled sections is provided. When the support material connects the loops with each other as one piece, a particularly good support action and a flat support surface are provided.

According to one embodiment of the invention, the flaps of the flow aid material are connected to each other by at least two spaced apart seams to a stay. Seams can be produced quickly and inexpensively. Also, the seam material impairs only insignificantly the flow of the matrix material.

According to one embodiment of the invention, a tear-off fabric is placed additionally onto the flow aid material. By means of this tear-off fabric it is possible more easily to remove the resin line again after manufacture of the component. The tear-off fabric is preferably placed onto the exterior side of the flow aid material. The tear-off fabric can be placed across the entire surface area of the flow aid material but it is also possible to place it only in those partial areas onto the flow aid material where an easier separation is desired.

It is to be noted that each of the aforementioned embodiments of the invention alone, but also in any combination with each other, can be combined with the embodiment according to the subject matter of the independent claim, inasmuch as no technically compelling obstacles stand in the way.

Further modifications and configurations of the invention can be taken from the following subject matter description.

BRIEF DESCRIPTION OF THE DRAWING

The only drawing FIGURE shows a resin line assembly with flow aid material enveloping the resin line and forming a double layer stay.

DESCRIPTION OF PREFERRED EMBODIMENT

The invention will now be described with the aid of one embodiment in more detail. In the attached illustration, a resin line 2 is shown through which a matrix material is guided. Through openings, not illustrated in detail in the drawing, the matrix material can penetrate from the interior of the resin line 2 to the exterior. Here, it is in contact with the flow aid material 4 which is placed as an envelope about the resin line 2.

The flow aid material 4 is dimensioned such that, extending beyond the circumference of the resin line 2, flaps 8 are projecting past the circumference of the resin line 2 which in a section form a double layer stay 6. The two projecting flaps 8 of the flow aid material 4 are connected to each other in the area of the stay 6 by two indicated seams 10.

At the end of the stay 6 facing away from the resin line 2, a section 12 that is angled relative thereto is provided. In the embodiment, the angled section 12 is comprised of two loops 14 into which the two ends of the flaps 8 are folded. The two loops 14 in the embodiment are also secured by seams 10. The ends of the flaps 8 are placed in the loops 14 such that they have a spacing relative to each other and a gap 16 between the two ends remains.

In the embodiment, a layer of a support material 18 has been placed into the loops 14. The support material should be penetrable for the matrix material so that the latter is not impaired when flowing out from the resin line 2 into the tool.

The afore described embodiment serves only for explaining the invention. The invention is not limited in any way to the embodiment. A person of skill in the art will have no difficulties in modifying the embodiment in a way appearing suitable to him in order to adapt it to a concrete application situation.

What is claimed is:

1. A resin line assembly, comprising:
a resin line comprising openings at a circumference of the resin line;
a flow aid material enveloping the resin line and placed about the resin line such that flaps of the flow aid material project away from the circumference of the resin line, wherein the flaps are arranged to form a double layer stay and are connected to each other in an area of the double layer stay;
an angled section that adjoins the double layer stay at an end of the double layer stay facing away from the resin line;
wherein at least one of the flaps has a section adjoining the double layer stay and folded into a loop, wherein the loop forms the angled section.

2. The resin line assembly according to claim 1, further comprising a support material that is placed into the loop and connected to the loop to reinforce the angled section.

3. A resin line assembly, comprising:
a resin line comprising openings at a circumference of the resin line;
a flow aid material enveloping the resin line and placed about the resin line such that flaps of the flow aid material project away from the circumference of the resin line, wherein the flaps are arranged to form a double layer stay and are connected to each other in an area of the double layer stay;
an angled section that adjoins the double layer stay at an end of the double layer stay facing away from the resin line;
wherein the flaps in a section adjoining the double layer stay are folded into loops and the loops form the angled section.

4. The resin line assembly according to claim 3, further comprising a support material that is placed into the loops and connected to the loops to reinforce the angled section.

5. The resin line assembly according to claim 3, wherein the loops are folded such that free ends of the flaps have a spacing relative to each other and form a gap.

6. The resin line assembly according to claim 1, further comprising a support material that is connected to the angled section to reinforce the angled section.

7. The resin line assembly according to claim 1, wherein the flaps are connected to each other in the area of the double layer stay by at least two seams spaced apart from each other.

8. The resin line assembly according to claim 1, further comprising a tear-off fabric placed onto the flow aid material.

9. The resin line assembly according to claim 3, wherein the flaps are connected to each other in the area of the double layer stay by at least two seams spaced apart from each other.

10. The resin line assembly according to claim 3, further comprising a tear-off fabric placed onto the flow aid material.

* * * * *